Mar. 3. 1925.  A. J. LUSH  1,528,221
ELECTRIC METER
Filed Feb. 19, 1920   3 Sheets-Sheet 1
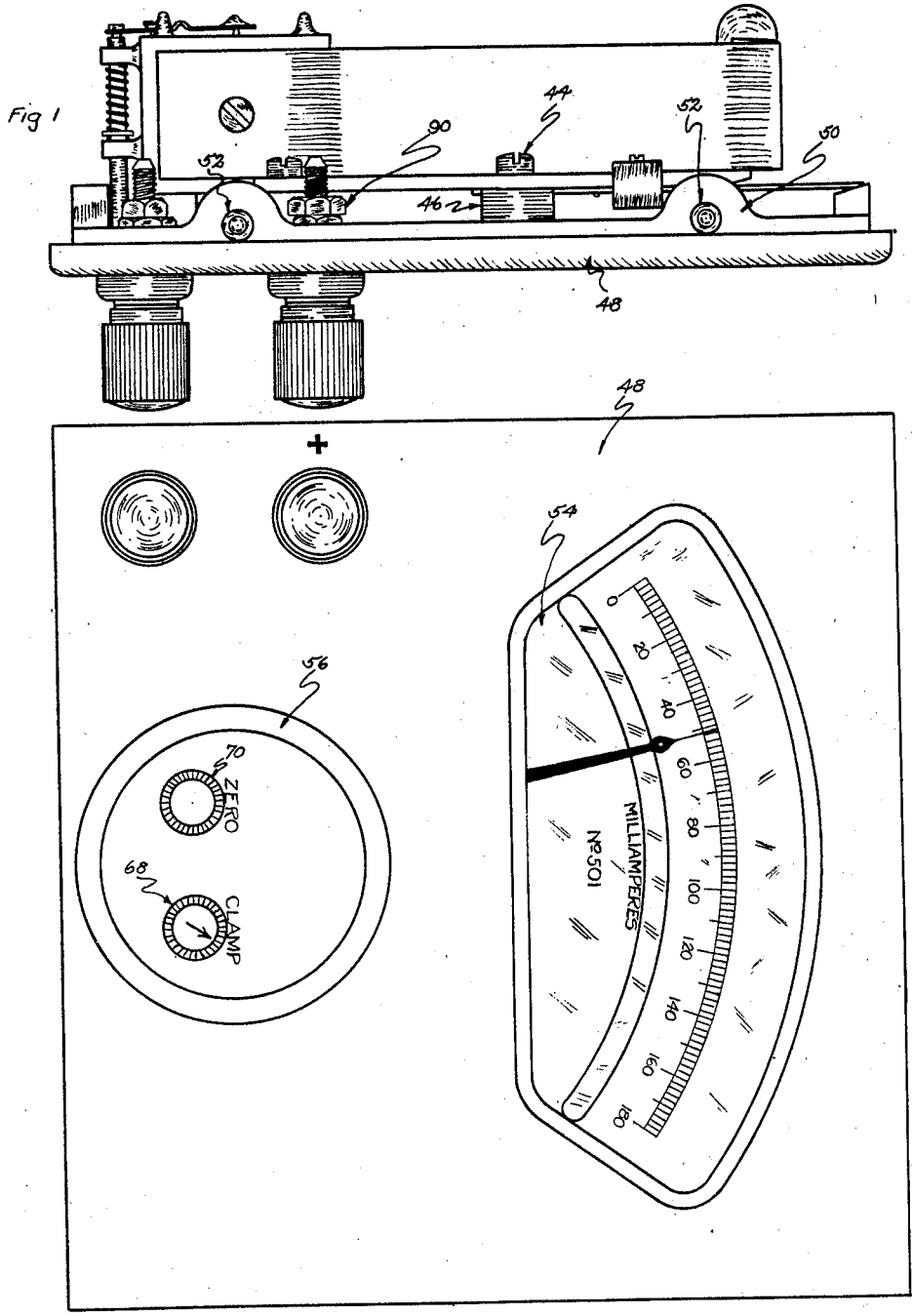
INVENTOR
ARTHUR J. LUSH
BY David Rines
ATTORNEY

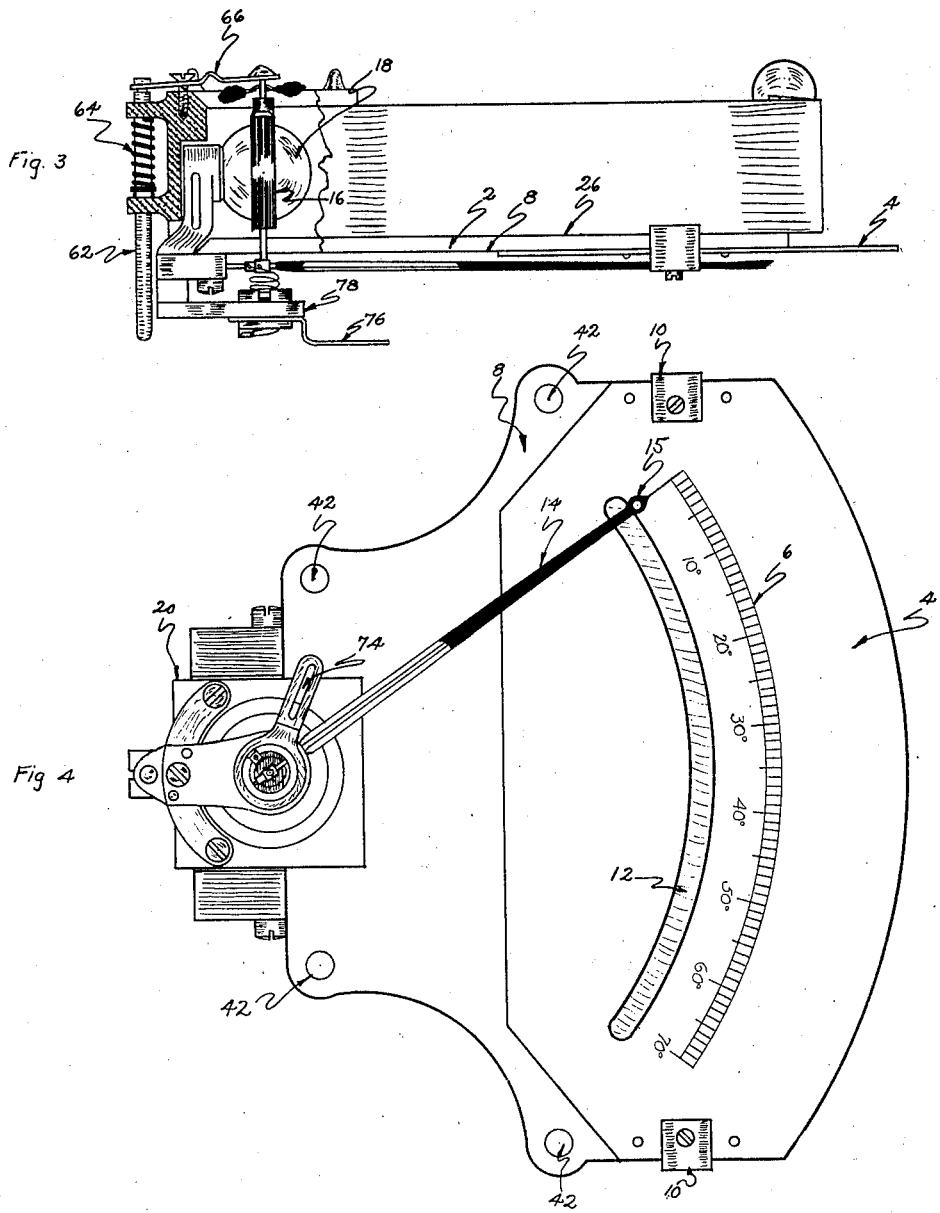

Mar. 3, 1925.
1,528,221
A. J. LUSH
ELECTRIC METER
Filed Feb. 19, 1920  3 Sheets-Sheet 3
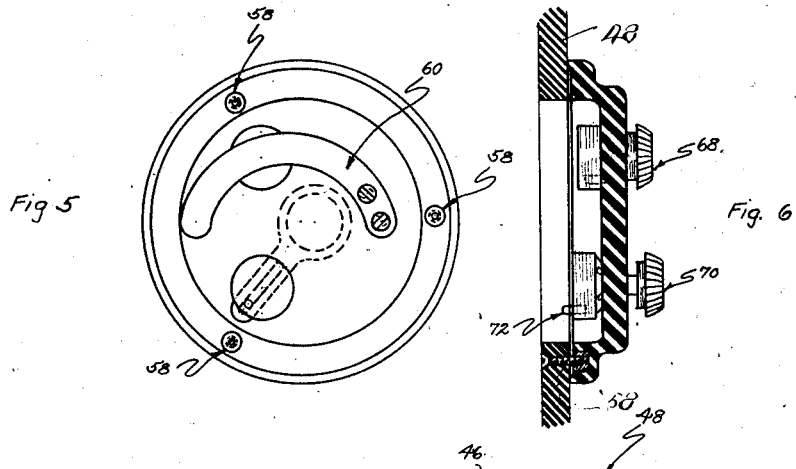
Fig. 5
Fig. 6
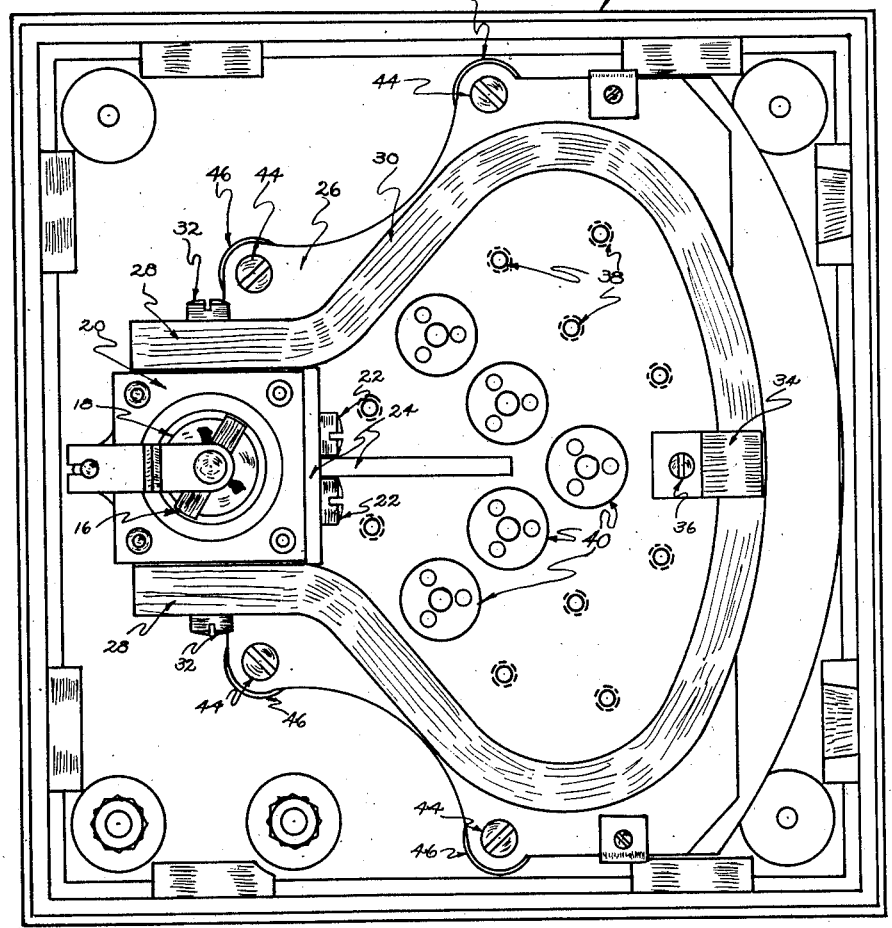
Fig. 7
INVENTOR
ARTHUR J. LUSH
BY David Rines
ATTORNEY Patented Mar. 3, 1925.

1,528,221

UNITED STATES PATENT OFFICE.

ARTHUR J. LUSH, OF CAMBRIDGE, MASSACHUSETTS, ASSIGNOR TO RAWSON ELECTRICAL INSTRUMENT COMPANY, OF CAMBRIDGE, MASSACHUSETTS, A CORPORATION OF MASSACHUSETTS.

ELECTRIC METER.

Application filed February 19, 1920. Serial No. 359,901.

*To all whom it may concern:*

Be it known that I, ARTHUR JOHN LUSH, a subject of the King of Great Britain, and a resident of Cambridge, in the county of Essex and Commonwealth of Massachusetts, have invented a new and useful Improvement in Electric Meters, of which the following is a specification.

The present invention relates to electric meters and more particularly to meters of the single-pivot type.

The object of the invention is to simplify the construction of electric meters, rendering them more efficient, serviceable and compact, and reducing their cost of manufacture.

With this end in view, the invention consists of the improved electric meter hereinafter described, illustrated in the accompanying drawings and defined in the appended claims.

In the accompanying drawings, Fig. 1 is a view in elevation of so much of the improved electric meter, removed from the meter box, as is necessary to an understanding of the present invention; Fig. 2 is a plan view of the same; Fig. 3 is a view similar to Fig. 1, with the insulating panel removed, and showing parts of the meter in section; Fig. 4 is a view similar to Fig. 2, but with the insulating panel removed; Fig. 5 is an underside plan view of the panel cap; Fig. 6 is a sectional view of the same; and Fig. 7 is an underside plan view of so much of the meter as is shown in Fig. 1.

The base plate of the preferred embodiment of the present invention is indicated at 2. A scale plate 4 having a scale 6 is detachably secured to one face 8 of the base plate in any suitable manner, as by means of clamps 10. The scale plate is provided with an opening 12 adjacent to the scale 6 through which is visible the face 8 of the base plate. The face 8 may be polished where visible through the opening 12 to constitute a mirror for a pointer 14 which is adapted to cooperate with the scale 6. The use of the customary separate mirror for avoiding parallax errors is thereby dispensed with. To this end, the base plate may be made of a suitable polishable metal. The invention is not restricted to the use of such metal, however, as any material may be employed and the face 8 thereof may be silvered or nickeled in any well-known manner. The flag 15 of the pointer may, if desired, be positioned over the opening 12 to provide for a more easy determination of the anti-parallax position.

The pointer is shown as adapted to be actuated by the magnetic flux consequent upon an electric current flowing through a winding 16 surrounding a steel ball 18 which is mounted within the opening of a non-magnetic block 20 having magnetic pole pieces (not shown) cast therein. The non-magnetic block 20 is secured by suitable securing members like screws 22 to a bracket 24 cast integral with the base plate 2 upon the face 26 thereof. The block 20 is mounted between the poles 28 of a permanent magnet 30. The poles of the magnet are secured to the block by suitable securing members, like screws 32. The intermediate portion of the magnet 30 is held in position upon the face 26 of the base plate by a hook-shaped clamp 34 that is fastened to the base plate at 36.

The base plate is provided with a number of tapped holes 38 to receive resistance coils 40 which will thus be enclosed by the magnet 30. By reason of this interior mounting of the coils 40 within the magnet chamber, there is less liability of drafts caused by heating of the windings influencing the pointer and thereby vitiating its accuracy.

The base plate 2 is provided with a number of openings 42 adapted to receive securing members, like screws, 44. These members are adapted to enter other openings in pillars 46, moulded upon a panel 48, to secure the panel to the base plate. Projections 50 are moulded upon the panel and are provided with openings 52 through which screws or other members may enter to secure the panel to the meter case (not shown). As the actuating means 16, 18, 20 and 28 for the pointer are secured to the face 26, and the scale plate 4 to the other face 8 of the base plate, with the base plate mounted between the actuating means and the scale plate, and as the panel is also secured to the base plate, the instrument as a whole may be handled as a unit when it is desired to place it in the meter case (not shown) or to remove it therefrom. The panel is provided with a window 54 through which the scale and the pointer may be viewed, and with an opening (not shown) which is adapted to be sealed by a cap 56 seated upon the outer face of the panel to render the interior of the instrument dust and dirt proof. Because of the above-described construction of the meter parts, it is possible to secure the cap 56 from the inner face of the panel, preventing the unauthorized removal of the cap from the outside. To this end, the inner face of the cap is provided with openings 58 which extend but part way into the cap and which are adapted to register with similarly positioned openings in the panel 48 to receive screws or other securing members.

A member 60 is interiorly secured to the cap 56 for engaging a clamp plunger 62 which is normally maintained in ineffective position by a spring 64. The plunger is adapted to act upon a clamp 66 for clamping the pointer 14 in a well known manner. The member 60 is adapted to be pressed into engagement with the clamp plunger 62 by a manually operable button 68 mounted at one side of the cap 56. A manually operable button 70, known as the zero shift, is mounted at the other side of the cap for adjusting the initial position of the pointer 14. To this end, the button 70 is provided with a cam 72 engaging a longitudinally extending slot 74 in an outer torsion 76 that is mounted in a manner well known upon a torsion plate 78 from which the pointer is controlled.

The above-described construction permits of a more convenient positioning of the parts than has been possible hitherto. With instruments as at present constructed, and particularly with instruments of the single-pivot type, some of the parts must be mounted after others have already been secured in place and after the instrument has been calibrated, and such subsequent mounting is difficult and liable to subject the instrument to strains so as to disturb the accuracy of the calibration. According to the present construction, the parts of the instrument may be assembled complete, with the exception of the calibrated scale, and all the connections may be made and finished off before the instrument is mounted within the case. A great deal of interior space which is inaccessible in meters as commonly constructed is thus made available to receive desired parts after the movement is mounted upon the base plate but before the base plate and the parts which are secured thereto are mounted, together with the panel, in the case. After the instrument has been mounted on its panel, a uniformly angularly divided calibrating scale may be applied and the instrument calibrated, after which the calibrating scale may be removed and the calibrated scale substituted. This substitution may be effected by means of the clamps 10 without in any way disturbing any parts of the meter or its accuracy. The source of inaccuracy due to possible strains resulting from the process of mounting the instrument in its case, found in present-day meters, is thereby eliminated.

It will be obvious that the invention is not restricted to the exact embodiment thereof which is herein illustrated and described, and that modifications may be made therein by persons skilled in the art without departing from its spirit and scope as defined in the appended claims.

What is claimed as new, is—

1. A meter comprising a base plate a face of which constitutes a mirror, a scale plate detachably mounted upon said face and through which the mirror is visible, and a pointer movable over the scale plate.

2. A meter comprising a base plate a face of which constitutes a mirror, a scale plate carrying a scale and having an opening adjacent to the scale mounted upon said face, whereby the mirror is visible through said opening, and a pointer movable over said scale and said opening.

3. An electric meter comprising a base plate having openings, an insulating panel having pillars and projections moulded thereon each provided with an opening, and securing means entering corresponding openings of the base plate and the pillars to secure the panel to the base plate, the openings of said projections being adapted to receive means for securing the panel to a meter box.

4. An electric meter comprising a base plate, a scale carried upon a face thereof, a pointer cooperating with the scale, means mounted upon the other face of the base plate, adapted to be subjected to the influence of an electric current for effecting the actuation of the pointer over the scale, an insulating panel having an opening, means for securing the panel to the base plate, a cap adapted to seat upon the outer face of the panel to seal the opening, and means for securing the cap to the panel from the inner face of the panel.

5. An electric meter comprising an indicating mechanism, means for clamping the same, a panel for the meter having an opening, a cap for closing the opening, a member interiorly secured to the cap for engaging the clamping means, a manually operable button mounted at one side of the cap for effecting the engagement of the member with the clamping means, and a manually operable button mounted at the other side of the cap for adjusting the position of the indicating mechanism.

6. A meter comprising a housing having an opening, an indicator, means in the housing for actuating the indicator, a cap for sealing the opening, and means for securing the cap to the housing from within the housing.

In testimony whereof, I have hereunto subscribed my name this 12th day of February, 1920.

ARTHUR J. LUSH.